(12) United States Patent
Himberg et al.

(10) Patent No.: US 11,585,680 B1
(45) Date of Patent: Feb. 21, 2023

(54) DYNAMIC MIXING OF AND SWITCHING BETWEEN SENSOR MEASUREMENTS IN HYBRID TRACKERS USING ELECTROMAGNETIC TRACKING

(71) Applicant: ALKEN Inc., Colchester, VT (US)

(72) Inventors: Henry E. Himberg, Williston, VT (US); Allan G. Rodgers, Jr., Waterbury, VT (US); Robert F. Higgins, South Burlington, VT (US)

(73) Assignee: ALKEN Inc., Colchester, VT (US)

( * ) Notice: Subject to any disclaimer, the term of this patent is extended or adjusted under 35 U.S.C. 154(b) by 0 days.

(21) Appl. No.: 17/737,162

(22) Filed: May 5, 2022

Related U.S. Application Data

(63) Continuation of application No. 16/773,482, filed on Jan. 27, 2020, now Pat. No. 11,326,905.

(60) Provisional application No. 62/825,991, filed on Mar. 29, 2019, provisional application No. 62/796,827, filed on Jan. 25, 2019.

(51) Int. Cl.
*G01D 5/22* (2006.01)
*G01B 11/14* (2006.01)

(52) U.S. Cl.
CPC ............ *G01D 5/22* (2013.01); *G01B 11/14* (2013.01)

(58) Field of Classification Search
CPC .................................. G01D 5/22; G01B 11/14
USPC ........................................................ 324/207.17
See application file for complete search history.

(56) References Cited

U.S. PATENT DOCUMENTS

| | | | |
|---|---|---|---|
| 6,172,499 B1 | 1/2001 | Ashe | |
| 7,640,106 B1 | 12/2009 | Stokar et al. | |
| 8,723,509 B2 * | 5/2014 | Patterson, III | ......... G01B 7/003 324/207.16 |
| 10,261,162 B2 | 4/2019 | Bucknor et al. | |
| 2019/0113966 A1 | 4/2019 | Connellan et al. | |
| 2019/0353745 A1 | 11/2019 | Zur et al. | |

FOREIGN PATENT DOCUMENTS

WO 2018102009 A1 6/2018

* cited by examiner

*Primary Examiner* — Farhana A Hoque
(74) *Attorney, Agent, or Firm* — Lerner, David, Littenberg, Krumholz & Mentlik, LLP

(57) ABSTRACT

A system and method for implementing a technique for dynamically switching between or mixing position and orientation determinations in a hybrid tracking system using both electromagnetic and non-electromagnetic tracking, and having a transmitter coil array for generating a magnetic field, a receiver circuit for sensing the magnetic field, and at least one non-magnetic sensor.

21 Claims, 11 Drawing Sheets

DYNAMIC MIXING OF AND SWITCHING BETWEEN SENSOR MEASUREMENTS IN HYBRID TRACKERS USING ELECTROMAGNETIC TRACKING

CROSS-REFERENCE TO RELATED APPLICATIONS

The present application is a continuation of U.S. patent application Ser. No. 16/773,482 (U.S. Pat. No. 11,326,905) filed Jan. 27, 2020, which claims the benefit of the filing date of U.S. Provisional Patent Application No. 62/796,827 filed Jan. 25, 2019, and U.S. Provisional Patent Application No. 62/825,991, filed Mar. 29, 2019, the disclosures of which are hereby incorporated herein by reference.

TECHNICAL FIELD

The present disclosure generally relates to electromagnetic tracking systems, and particularly to hybrid electromagnetic tracking systems.

BACKGROUND

Electromagnetic tracking systems use electromagnetic field emitters and sensors to determine position and/or orientation (PnO) of a tracked object. Electromagnetic tracking systems provide a high level of performance in terms of accuracy, precision and update rate, but their accuracy is reduced when nearby ferrous or conductive materials distort the generated magnetic field. Alternative non-magnetic tracking technologies such as optics, gyroscopes, accelerometers, barometers, RF and acoustics (or some combination of these and/or other types of sensors) cannot offer the same benefits as electromagnetic trackers. For example, optical systems suffer from occlusion problems. Gyroscopes and accelerometers (often combined in an Inertial Measurement Unit or IMU) suffer from drift issues over the longer term.

SUMMARY

One aspect of the disclosure is directed to a system including a magnetic tracking subsystem configured to track each of a position and an orientation of a first object relative to a second object, and a non-magnetic tracking subsystem. The magnetic tracking subsystem includes a transmitter circuit mounted to one of the first object or the second object and including a plurality of transmitter coils aligned at different transmitter axes and an actuating circuit configured to actuate the transmitter coils to generate a magnetic field at different times or at different frequencies, a receiver circuit mounted to the other one of the first object or the second object and including a plurality of receiver elements aligned at different receiver axes, each receiver element configured to detect a magnetic field along its respective receiver axis, each receiver element configured to detect a respective portion of the magnetic field generated by the transmitter coils, the detected portion of the magnetic field including a plurality of components, each component being attributable to a given one of the transmitter coils based on time or frequency, and each receiver element being configured to generate a corresponding electrical signal for each component of the magnetic field, and one or more processors configured to receive the respective electrical signals generated by the plurality of receiver elements, construct a matrix representing the respective electrical signals generated by the plurality of receiver elements, each given row of the matrix representing electrical signals received by a common receiver element, and each column of the matrix representing the electrical signals corresponding to received components of the magnetic field from a common transmitter coil, determine a level of reliability of the magnetic tracking subsystem based at least in part on a quality of structure of a dipole field detected by the plurality of receiver elements, the quality of structure of the dipole field being derived from an analysis of the constructed matrix, and determine the position and the orientation of the first object relative to the second object using one or a combination of the magnetic tracking subsystem and the non-magnetic tracking subsystem. A contribution of the magnetic tracking subsystem to the determined position and orientation of the first object may be based on the determined level of reliability of the magnetic tracking subsystem.

In some examples, the quality of structure of the dipole may be derived from a degree of symmetry of the constructed matrix. In some examples, the quality of structure of the dipole may be derived independent of the non-magnetic tracking subsystem.

In some examples, the non-magnetic tracking subsystem may include one or more of: a gyroscope, an accelerometer, a magnetometer, a barometer, an optical sensor, an acoustic sensor, a radio frequency (RF) sensor, a global positioning system (GPS) receiver, or a radar chip. The one or more processors may be configured to, if the level of reliability of the magnetic tracking subsystem is determined to be reliable, determine the position and the orientation of the first object using the magnetic tracking subsystem, and if the level of reliability of the magnetic tracking subsystem is determined to be unreliable, determine the position and the orientation of the first object using the non-magnetic tracking subsystem.

In some examples, the non-magnetic tracking subsystem may include an inertial motion unit (IMU) configured to obtain one or more measurements indicative of the position and the orientation of the first object relative to the second object. The one or more processors may be configured to, if the level of reliability of the magnetic tracking subsystem is determined to be reliable, update an IMU function so that the position and the orientation of the first object derived from the one or more measurements from the IMU matches the position and the orientation of the first object derived from the magnetic tracking subsystem.

In some examples, the non-magnetic tracking subsystem may be affixed to the receiver circuit of the magnetic tracking subsystem. In other examples, the non-magnetic tracking subsystem may be affixed to the transmitter circuit of the magnetic tracking subsystem.

In some examples, the one or more processors may be configured to determine the position and the orientation of the first object relative to the second object using a weighted combination of the magnetic tracking subsystem and the non-magnetic tracking subsystem. A weighting of the determined position or orientation of the first object derived from the magnetic tracking subsystem may be based at least in part on a comparison of the level of reliability of the magnetic tracking subsystem and a determined level of reliability of the non-magnetic tracking subsystem. In some examples, the level of reliability of the given non-magnetic tracking device may be based at least in part on one or more of a motion model, a noise measurement or a rate of change measurement.

In some examples, the non-magnetic tracking subsystem may include a plurality of non-magnetic tracking devices.

The one or more processors may be configured to derive the determined position or orientation of the first object from a combination of all measurements from the plurality of non-magnetic tracking devices and the electrical signals from the magnetic tracking subsystem using a single filter. Additionally or alternatively, the one or more processors may be configured to, for a first non-magnetic tracking device, estimate at least one of the position or the orientation of the first object using a first filter, for a second non-magnetic tracking device, estimate at least one of the position or the orientation of the first object using a second filter, and derive the determined position or orientation of the first object from a combination of an output of the first filter, an output of the second filter, and the electrical signals from the magnetic tracking subsystem.

In some examples, the non-magnetic tracking subsystem may include an inertial motion unit (IMU) configured to obtain one or more first measurements indicative of the position of the first object relative to the second object, and to obtain one or more second measurements indicative of the orientation of the first object relative to the second object, and the one or more processors may be configured to pre-process the one or more first measurements from the IMU using the first filter, and pre-process the one or more second measurements from the IMU using the second filter.

In some examples, the magnetic tracking subsystem may further include a second transmitter circuit, and the one or more processors may be further configured to construct a second matrix representing respective electrical signals generated by the plurality of receiver elements from a second magnetic field generated by the second transmitter circuit, determine a second level of reliability of the second matrix based at least in part on quality of structure of the second magnetic field as detected by the plurality of receiver elements, the quality of structure of the second magnetic field being derived from an analysis of the second matrix, and determine the position and the orientation of the first object relative to the second object using one or a combination of the constructed matrix, the second matrix and the non-magnetic tracking subsystem. A contribution of the magnetic tracking subsystem to the determined position and orientation of the first object may be based on the determined level of reliability and the second level of reliability.

In some examples, the one or more processors may be configured to estimate a plurality of preliminary position and/or orientation estimates of the first object relative to the second object using a combination of the magnetic tracking subsystem and the non-magnetic tracking subsystem, and determine the position and the orientation of the first object relative to the second object, wherein a contribution of each preliminary position and/or orientation estimate is based on the determined level of reliability of at least one of the magnetic tracking subsystem or the non-magnetic tracking subsystem. The plurality of preliminary position and orientation estimates may include at least two of a first preliminary position and/or orientation estimate based on data from the magnetic tracking subsystem only, a second preliminary position and/or orientation estimate based on position data derived from the magnetic tracking subsystem orientation data derived from the non-magnetic tracking subsystem, and a third preliminary position and/or orientation estimate based on data derived from the non-magnetic tracking subsystem only.

In some examples, the one or more processors may be configured to apply orientation data derived from the non-magnetic tracking subsystem to the constructed matrix in order to derive position data from the magnetic tracking subsystem, and determine the position and the orientation of the first object relative to the second object based on the position data derived from the magnetic tracking subsystem and the orientation data derived from the non-magnetic tracking subsystem.

Another aspect of the disclosure is directed to a method for tracking each of a position and an orientation of a first object relative to a second object using a magnetic tracking system that includes a transmitter circuit affixed to one of the first object or the second object and including a plurality of transmitter coils aligned at different transmitter axes and an actuating circuit configured to actuate the transmitter coils to generate a magnetic field at different times or at different frequencies a receiver circuit mounted to the other one of the first object or the second object and including a plurality of receiver elements aligned at different receiver axes, each receiver element configured to detect a magnetic field along its respective receiver axis, each receiver element configured to detect a portion of the magnetic field generated by the transmitter coils, the detected portion of the magnetic field including a plurality of components, each component being attributable to a given one of the transmitter coils based on time or frequency, each receiver element being configured to generate a corresponding electrical signal for each component of the magnetic field, and one or more processors. The method may be performed by the one or more processors and may include receiving the respective electrical signals generated by the plurality of receiver elements, constructing a matrix representing the respective electrical signals generated by the plurality of receiver elements, each given row of the matrix representing electrical signals received by a common receiver element, and each column of the matrix representing the electrical signals corresponding to received components of the magnetic field from a common transmitter coil, determining a level of reliability of the magnetic tracking system based at least in part on a quality of structure of the dipole field detected by the plurality of receiver elements, the quality of structure of the dipole field being derived from an analysis of the constructed matrix, and determining the position and the orientation of the first object relative to the second object using one or a combination of the magnetic tracking system and a non-magnetic tracking system. A contribution of the magnetic tracking system to the determined position and orientation of the first object may be based on the determined level of reliability of the magnetic tracking system.

In some examples, the method may further include deriving the quality of structure of the dipole field from a degree of symmetry of the constructed matrix. In some examples, the method may further include deriving the quality of structure of the dipole field independent of the non-magnetic tracking subsystem.

In some examples, the method may further include, if the level of reliability of the magnetic tracking system is determined to be reliable, determining, by the one or more processors, the position and the orientation of the first object using the magnetic tracking system, and if the level of reliability of the magnetic tracking system is determined to be unreliable, determining, by the one or more processors, the position and the orientation of the first object relative to the second object using the non-magnetic tracking subsystem. The non-magnetic tracking system may include an IMU configured to obtain one or more measurements indicative of the position and the orientation of the first object relative to the second object, and the method may further include, if the level of reliability of the magnetic tracking system is determined to be reliable, updating, by the one or more processors, an IMU function so that the position and the orientation of the first object derived from the one or more measurements from the IMU matches the position and the orientation of the first object derived from the magnetic tracking system.

In some examples, the method may further include determining, by the one or more processors, the position and the orientation of the first object relative to the second object using a weighted combination of the magnetic tracking system and the non-magnetic tracking system. A weighting of the determined position or orientation of the first object derived from the magnetic tracking system may be based at least in part on a comparison of the level of reliability of the magnetic tracking subsystem and a determined level of reliability of the non-magnetic tracking subsystem. In some examples, the level of reliability of the non-magnetic tracking system may be based at least in part on one or more of a motion model, a noise measurement or a rate of change measurement.

In some examples, the non-magnetic tracking system may include a plurality of non-magnetic tracking devices. The method may further include deriving, by the one or more processors, the determined position or orientation of the first object from a combination of all measurements from the plurality of non-magnetic tracking devices and the electrical signals from the magnetic tracking system using a single filter. Additionally, or alternatively, the method may further include for a first non-magnetic tracking device, estimating, by the one or more processors, at least one of the position or the orientation of the first object using a first filter, for a second non-magnetic tracking device, estimating, by the one or more processors, at least one of the position or the orientation of the first object using a second filter, and deriving, by the one or more processors, the determined position or orientation of the first object from a combination of an output of the first filter, an output of the second filter, and the electrical signals from the magnetic tracking subsystem to derive the determined position or orientation of the first object.

In some examples, the non-magnetic tracking system may include an IMU configured to obtain one or more first measurements indicative of the position of the first object relative to the second object, and to obtain one or more second measurements indicative of the orientation of the first object relative to the second object. The method may further include pre-processing, by the one or more processors, the one or more first measurements from the IMU using the first filter, and pre-processing, by the one or more processors, the one or more second measurements from the IMU using the second filter.

In some examples, the magnetic tracking subsystem may further include a second transmitter circuit. The method may further include constructing, by the one or more processors, a second matrix representing respective electrical signals generated by the plurality of receiver elements from a second magnetic field generated by the second transmitter circuit, determining, by the one or more processors, a second level of reliability of the second matrix based at least in part on quality of structure of the second magnetic field as detected by the plurality of receiver elements, the quality of structure of the second magnetic field being derived from an analysis of the second matrix, and determining, by the one or more processors, the position and the orientation of the first object relative to the second object using one or a combination of the constructed matrix, the second matrix and the non-magnetic tracking subsystem. A contribution of the magnetic tracking subsystem to the determined position and orientation of the first object may be based on the determined level of reliability and the second level of reliability.

In some examples, the method may further include estimating, by the one or more processors, a plurality of preliminary position and/or orientation estimates of the first object relative to the second object using a combination of the magnetic tracking subsystem and the non-magnetic tracking subsystem. A contribution of each preliminary position and/or orientation estimate to determining the position and the orientation of the first object relative to the second object may be based on the determined level of reliability of at least one of the magnetic tracking subsystem or the non-magnetic tracking subsystem. The plurality of preliminary position and orientation estimates may include at least two of a first preliminary position and/or orientation estimate based on data from the magnetic tracking subsystem only, a second preliminary position and/or orientation estimate based on position data derived from the magnetic tracking subsystem orientation data derived from the non-magnetic tracking subsystem, and a third preliminary position and/or orientation estimate based on data derived from the non-magnetic tracking subsystem only.

In some examples, the method may further include applying, by the one or more processors, orientation data derived from the non-magnetic tracking subsystem to the constructed matrix in order to derive position data from the magnetic tracking subsystem, and determining, by the one or more processors, the position and the orientation of the first object relative to the second object based on the position data derived from the magnetic tracking subsystem and the orientation data derived from the non-magnetic tracking subsystem.

DETAILED DESCRIPTION

Figure 1:
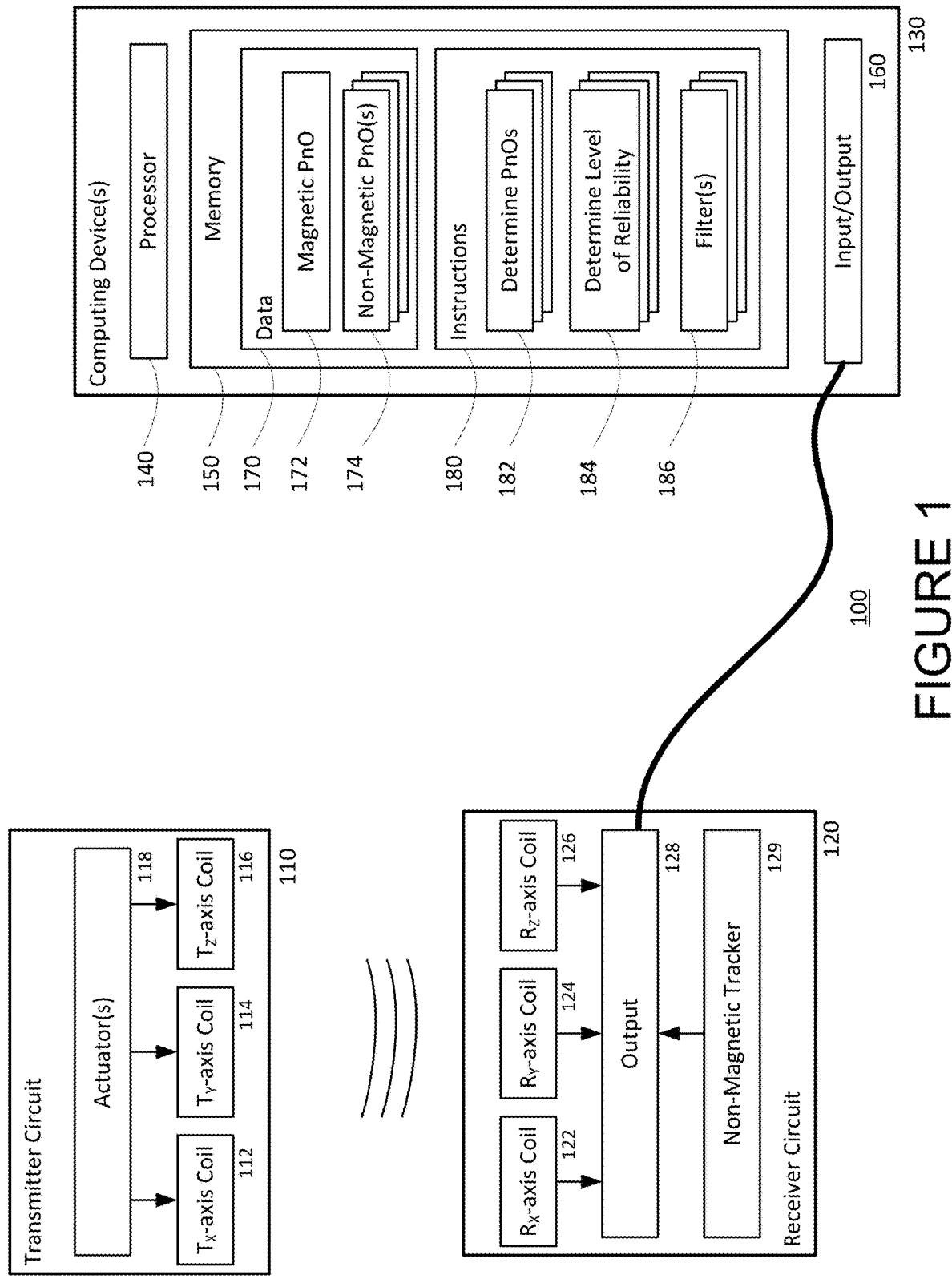
FIG. 1 is a block diagram of an electromagnetic tracking system in accordance with an embodiment of the present disclosure.

FIG. 1 is a block diagram illustrating a hybrid tracking system 100. The system 100 may include each of a magnetic tracking subsystem and a non-magnetic tracking subsystem. Each subsystem may be independently capable of tracking a position and/or orientation (PnO) of a tracked object.

The magnetic tracking subsystem includes a transmitter circuit 110 for generating an electromagnetic field, and a receiver circuit 120 for sensing the generated electromagnetic field and generating electrical signals based on the sensed electromagnetic field. Each of the transmitter circuit 110 and the receiver circuit 120 may be connected to one or more computing devices 130 included in the system electronics in order to transmit and receive data with the computing devices 130. The one or more computing devices 130 are configured to receive and process the electrical signals generated by the receiver circuit 120. In the example of FIG. 1, the connection between the receiver circuit 120 and one or more computing devices 130 is shown as a wired connection using a cable, such as a USB Type-C cable. Other cables typically used in electromagnetic tracing systems, or wireless connections, including short range communication protocols such as near-field communication (NFC), WiFi, Bluetooth, Bluetooth LE, may be used. Additionally or alternatively, the transmitter circuit and the receiver circuit may be connected to one another in a wired or wireless manner in order to provide information therebetween, such as providing phase information from the transmitter to the receiver to avoid phase ambiguity of the electromagnetic field generated by the transmitter.

In the example of FIG. 1, the transmitter circuit 110 includes a transmitter coil array having a plurality of transmitter coils 112, 114, 116 aligned along X, Y, and Z axes of the transmitter, respectively. In FIG. 1, these axes are denoted $T_x$, $T_y$, and $T_z$. The X, Y and Z axes may be orthogonal to one another, or they may be different from one another without being orthogonal. Generally, the axes form a three-dimensional coordinate system (e.g., do not all extend within a common plane). The transmitter circuit 110 may further include an actuating circuit 118 configured to actuate the transmit coils at different times or different frequencies. The actuating circuit 118 may include one or more frequency generators for generating one or more alternating signals. A different frequency signal may be provided to a respective driver for driving each coil, respectively. Alternatively, the same alternating signal may be input to a multiplexer which is timed by a clock included in the transmitter, and outputs of the multiplexer may be provided to the respective drivers at different times. The drivers may further include additional components for driving the coils, such as one or more amplifier circuits. Driving the coils may result in an electromagnetic field being generated by the coils.

The receiver circuit 120 includes a receiver coil array having a plurality of receiver coils 122, 124, 126 aligned along X, Y, and Z axes of the receiver circuit, respectively. In FIG. 1, these axes are denoted $R_x$, $R_y$ and $R_z$. As with the transmitter axes, the X, Y and Z axes of the receiver circuit 120 may be orthogonal to one another, or may be different from one another without being orthogonal. Generally, the axes form a three-dimensional coordinate system (e.g., do not all extend within a common plane). Since the receiver circuit and transmitter circuit are capable of being oriented independent of one another, it should be understood that the X, Y and Z axes of one circuit are not necessarily aligned with the X, Y and Z axes of the other circuit. The electromagnetic field generated by the transmitter circuit 110 may cause an alternating electric current to be generated in the windings of the receiver coils 122, 124, 126. In the case of a time-division based transmission, the timing of the electric currents may indicate which of the transmitter coils 112, 114, 116 generated the electromagnetic field that resulted in the electric current. The receiver circuit 120 may be communicatively connected to each of the transmitter circuits in order to synchronize the timing of the receiver circuit with that of the transmitter circuits. In the case of a frequency-division based transmission, a frequency of the alternating electric current may indicate which of the transmitter coils 112, 114, 116 is responsible. In this fashion, each of the receiving coils in the receiving coil array may derive a set of components of the electromagnetic field, whereby each component of the set is generated by a different transmitter coil of the transmitting coil array.

The receiver circuit 120 may further include an output circuit 128 for receiving the generated electric currents and providing the currents as electrical signals to an external device, such as to computing device(s) 130. The output to the system electronics may be an analog or digital signal, depending on the available hardware and software included in each of the output circuit 128 and the one or more computing devices 130.

The magnetic tracking subsystem includes a non-magnetic tracker 129. The non-magnetic tracker may be any one or combination of gyroscopes, accelerometers, barometers, optical sensors, acoustic sensors, radio frequency (RF) sensors, global positioning system (GPS) receivers, radar chips, and others. Each of these sensing devices may be capable of tracking a movement of the tracked object, in terms of position, orientation, or a combination thereof. Movement of the tracked object may be determined by the non-magnetic tracker 129 independent of the determinations by the electromagnetic tracking system. For purposes of the present disclosure, the "non-magnetic tracker" may additionally or alternatively include magnet-based sensors that do not rely on an electromagnetic transmitter circuit for its sensor readings, such as a magnetometer for sensing a magnetic field polarity (such as a magnetic field of the Earth).

The non-magnetic tracker 129 may be connected to the one or more computing devices 130 included in the system electronics in order to transmit and receive data with the computing devices 130. The one or more computing devices 130 are configured to receive and process the electrical signals generated by the non-magnetic tracker 129. As with the receiver circuit 120 of the magnetic tracking subsystem, the connection between the computing devices 130 and the non-magnetic tracker 129 may be wired or wireless.

In the example of FIG. 1, the non-magnetic tracker 129 is shown as being included in the receiver circuit 120, and the output 128 of the receiver circuit 120 is shown as transmitting electrical signals to the computing devices 130 for both the magnetic and non-magnetic subsystems. However, in other examples, other configurations are possible. For example, the non-magnetic tracker may instead be included in the transmitter circuit 110. For further example, the non-magnetic tracker may be positioned separate from each of the transmitter circuit and the receiver circuit. Data collected by the non-magnetic tracker may be transmitted to the computing devices 130 by a separate wired or wireless connection, or relayed via one or both of the transmitter circuit and the receiver circuit.

In the example of FIG. 1, a single non-magnetic tracker 129 is shown. However, in other examples, the non-magnetic tracking subsystem may include multiple non-magnetic trackers. The non-magnetic trackers may be kept together, such as all in the receiver circuit, or all in the transmitter circuit. Alternatively, the non-magnetic trackers may be dispersed throughout the system 100, such as some non-magnetic trackers being included in the receiver circuit 120, in the transmitter circuit 110, separate from the receiver and transmitter circuits, or any combination thereof.

The magnetic and non-magnetic subsystems may be configured to ensure that data collected at the same time by the respective systems is compared to one another. This may involve wiring the magnetic and non-magnetic subsystems together to synchronize data collection and transmission, providing time signatures with the collected data, or some combination thereof.

The one or more computing devices 130 of the system electronics may include a processor 140, memory 150, and other components typically present in general purpose computers. The computing devices 130 may further include one or more input/output connections 160 for sending and receiving data from the transmitter circuit, receiver circuit, non-magnetic tracker, or any combination thereof.

The processor 140 may be a well-known processor or other lesser-known types of processors. Alternatively, the processor 140 can be a dedicated controller such as an ASIC. The memory 150 can store information accessible by the processor 140, including data 170 that can be retrieved, manipulated or stored by the processor 140, in accordance with instructions 180 stored in the memory. The memory 150 may be a type of non-transitory computer readable medium capable of storing information accessible by the processor 140, such as a hard-drive, solid state drive, tape drive, optical storage, memory card, ROM, RAM, DVD, CD-ROM, write-capable, and read-only memories.

Although the system described herein is not limited by a particular data structure, the data 170 may be stored in computer registers, in a data store as a structure having a plurality of different fields and records, or documents, or buffers. The data 170 may also be formatted in a computer-readable format such as, but not limited to, binary values, ASCII or Unicode. Moreover, the data 170 can include information sufficient to identify relevant information, such as numbers, descriptive text, proprietary codes, pointers, references to data stored in other memories, including other network locations, or information that is used by a function to calculate relevant data. The instructions 180 may be a set of instructions executed directly, such as machine code, or indirectly, such as scripts, by the processor 140. In this regard, the terms "instructions," "steps," "programs" and "routines" can be used interchangeably herein. The instructions 180 can be stored in object code format for direct processing by the processor 140, or other types of computer language including scripts or collections of independent source code modules that are interpreted on demand or compiled in advance.

Although FIG. 1 functionally illustrates the processor 140 and memory 150 as being within the same computing device block 130, the processor 140 and memory 150 may actually include multiple processors and memories that may or may not be stored within the same physical housing. For example, some of the data 170 and instructions 180 may be stored on a removable CD-ROM and others within a read-only computer chip. Some or all of the instructions and data can be stored in a location physically remote from, yet still accessible by, the processor 140. Similarly, the processor 140 can actually include a collection of processors, which may or may not operate in parallel.

In the example of FIG. 1, the data 170 may include information for determining a position and orientation (PnO) of the receiver circuit 120 relative to the transmitter circuit 110, or vice versa, according to the magnetic tracking subsystem 172. Where the receiver circuit 120 is affixed to a tracked object, the magnetic PnO data 172 may by extension indicate each of a position and orientation of the tracked object relative to the transmitter circuit 110, or vice versa. For example, the magnetic PnO data 172 may include a signal matrix from which the PnO of the tracked object may be determined. The values included in the matrix may be representations of the raw magnetic field data sensed by the receiver coils 122, 124, 126, including a magnitude and polarity of the magnetic field sensed from each one of the transmitter coils 112, 114, 116 of the transmitter circuit 110.

In the example of FIG. 1, in which three transmitter coils generate an electromagnetic field sensed by three receiver coils, the matrix may be a 3×3 matrix, whereby each component of the matrix may correspond to a different transmitter coil-receiver coil pair. Table 1 shows an example matrix:

TABLE 1

| | | |
|---|---|---|
| $T_X R_X$ | $T_X R_Y$ | $T_X R_Z$ |
| $T_Y R_X$ | $T_Y R_Y$ | $T_Y R_Z$ |
| $T_Z R_X$ | $T_Z R_Y$ | $T_Z R_Z$ | whereby "$T_x R_x$" denotes a component of the electromagnetic field generated by the X-axis transmitter coil 112 and sensed by the X-axis receiver coil 122, "$T_x R_y$" denotes a component of the electromagnetic field generated by the X-axis transmitter coil 112 and sensed by the Y-axis receiver coil 124, and so on. In other example configurations, M transmitter coils may be used, and N receiver coils may be used, whereby N is a value of two or more and may or may not be equal to three. In such configurations, an M×N matrix may be included in the PnO data. It should be recognized that if M×N <6, then it may be not be possible to solve for six variables using only the matrix, such that six degrees of freedom (such as three axes of position and three axes of orientation) of the receiver circuit may not be determined based only on the matrix. In such instances, additional sensor information may be required to provide a complete PnO determination.

Reliability of the magnetic PnO data 172 may vary based on various factors. For example, reliability of the magnetic PnO data 172 may be low in a tracking space that has high levels of distortion. Distortion may be a function of a distance between the transmitter circuit 110 and receiver circuit 120, since the magnetic field may attenuate to some degree over a long enough distance. Distortion may additionally or alternatively be affected by the presence of distorting elements in the vicinity of the transmitter-receiver pair. The distorting elements may have properties by which the magnetic field induces eddy currents at those elements, and the eddy currents may in turn create noise and distortions in the magnetic field. Examples of distorting elements may be objects positioned in or about the tracking region and containing any one or combination of, for example, aluminum, copper, or carbon steel. It is also possible that increasing the distance between the transmitter circuit 110 and receiver circuit 120 will result in more distorting elements to be present between the transmitter-receiver pair, or for the receiver circuit to be closer to distorting elements than to the transmitter circuit.

The data 170 may include data for determining a position and orientation (PnO) of the tracked object according to the one or more non-magnetic tracking subsystem 174. Each non-magnetic tracker of the non-magnetic tracking subsystem may derive its own non-magnetic PnO determination 174 independent of the other non-magnetic trackers. For example, the non-magnetic tracking subsystem may include an optical sensor configured to track changes in a position of the tracked object independent of other sensors, and may further include one or more gyroscope configured to track changes in an orientation of the tracked object independent of the other sensors. Other sensors, such as acoustic sensors, radio frequency trackers, GPS trackers, and so on, in place of or in addition to the above-noted example sensors.

In some instances, a subset of the non-magnetic trackers may be combined to derive a PnO determination independent of the other non-magnetic trackers. For example, a non-magnetic tracker included in the system may be an inertial motion unit (IMU). The IMU may include one or more motion tracking devices, including but not limited to any one or combination of accelerometers (such as for tracking linear acceleration), gyroscopes (such as for tracking rotation) and magnetometers (such for sensing changes to a magnetic field along a plane or within a space). An IMU typically includes at least three tracking devices in order to provide coordinate motion along three axes. In one example, an IMU may include three accelerometers configured to measure linear acceleration along three axes, three gyroscopes configured to measure rotational rate about the three axes, respectively, and optionally a magnetometer to track a direction of the Earth's magnetic field. The one or more motion tracking devices may output respective sensor signals indicating the measurements, and a motion of the IMU may be determined from the signals. Inclusion of three accelerometers and three gyroscopes may enable tracking of the IMU along 6 degrees of freedom (6-DOF), including both position and orientation of the IMU.

Reliability of the non-magnetic PnO data 174 may also vary based on various factors. For example, in the case of an optical sensor, a direct line of sight between the sensor and tracked object may be required, such that tracking is not possible if the tracked object becomes blocked. Similar blockages and interferences may affect acoustic devices, as well as GPS devices (such as for tracked objects moving above and below ground or in and out of buildings). Acoustic devices may also be less reliable in noisy areas. Accelerometer, gyroscope, and IMU data as a whole, may be prone to vibrations, as well as drift issues over a long enough span of time, such that reliability of the IMU PnO determination decreases as a duration of use increases. Additionally, as with electromagnetic trackers, increasing the distance between some non-magnetic trackers and the tracked object may decrease reliability of the PnO determination.

In view of the varying levels of reliability for the magnetic and non-magnetic tracking subsystems, the computing device includes program instructions 180 for combining the PnO data 172, 174 in various manners that improve reliability of the system's overall PnO determination. For example, the instructions 180 included in the memory 150 of the one or more computing device(s) 130 may include instructions for processing the data from a given one or set of trackers to determine a PnO of the tracked object 182 based on the PnO data 172, 174. In the case of the magnetic PnO data 172, these instructions may include instructions for separating the electrical signals into their respective components and constructing the matrices with these components. In the case of the non-magnetic PnO data, these instructions may include other instructions for processing the available sensor data to derive a PnO solution using known techniques.

The instructions 180 may further include instructions for determining a level of reliability 184 for one or more of the independent PnO determinations. As noted above, the level of reliability may vary for each tracking device depending on certain factors such as distance to the tracked objection, presence of noise, vibrations, distorting materials, sensor drift. Depending on the various factors in play, the level of reliability determination 184 may be based on one or a combination of motion models, noise measurements, vibration measurements, rate of change measurements, time measurements, and the like. The non-magnetic PnO data 174 itself may be analyzed to derive the level of reliability. For instance, noise in acoustic sensor data may be analyzed based on a signal-to-noise ratio of the sensor data, which may be indicated in the acoustic sensor data itself. Similarly, optical sensor data may itself indicate when a line of sight to the tracked object is lost, and this may indicate unreliability of the optical sensor. In other examples, a level of unreliability may be analyzed based on data from another senor external to the non-magnetic tracker, such as a clock used to measure the likelihood of IMU drift.

The instructions 180 may further include one or more filters 186 for combining the PnO data 172, 174. The filters may be configured to take the PnO data 172, 174 as input and derive a combined PnO solution from the inputs. The filters may be cascaded in multiple stages, provided in parallel in a single stage, or some combination thereof. Examples of filters methods may include Kalman filtering, complementary filters, fixed gain filters (such as a Madgwick filter), and others. In operation, the filters 186 may be designed to use weighting when combining the PnO data 172, 174 based on properties of the filtered data, such as noise, magnetic distortion, rate of change (such as a change in velocity) or other measurable quantities). The filters 186 may further rely on motion models and error covariance to evaluate the received data from the various sensor sources and identify patterns in the data that may indicate the presence of errors for one or a combination of sensor sources, an absence of errors for one or a combination of sensors sources, or both. Example filter arrangements are described in greater detail in connection with FIGS. 7-11 below.

Figure 2:
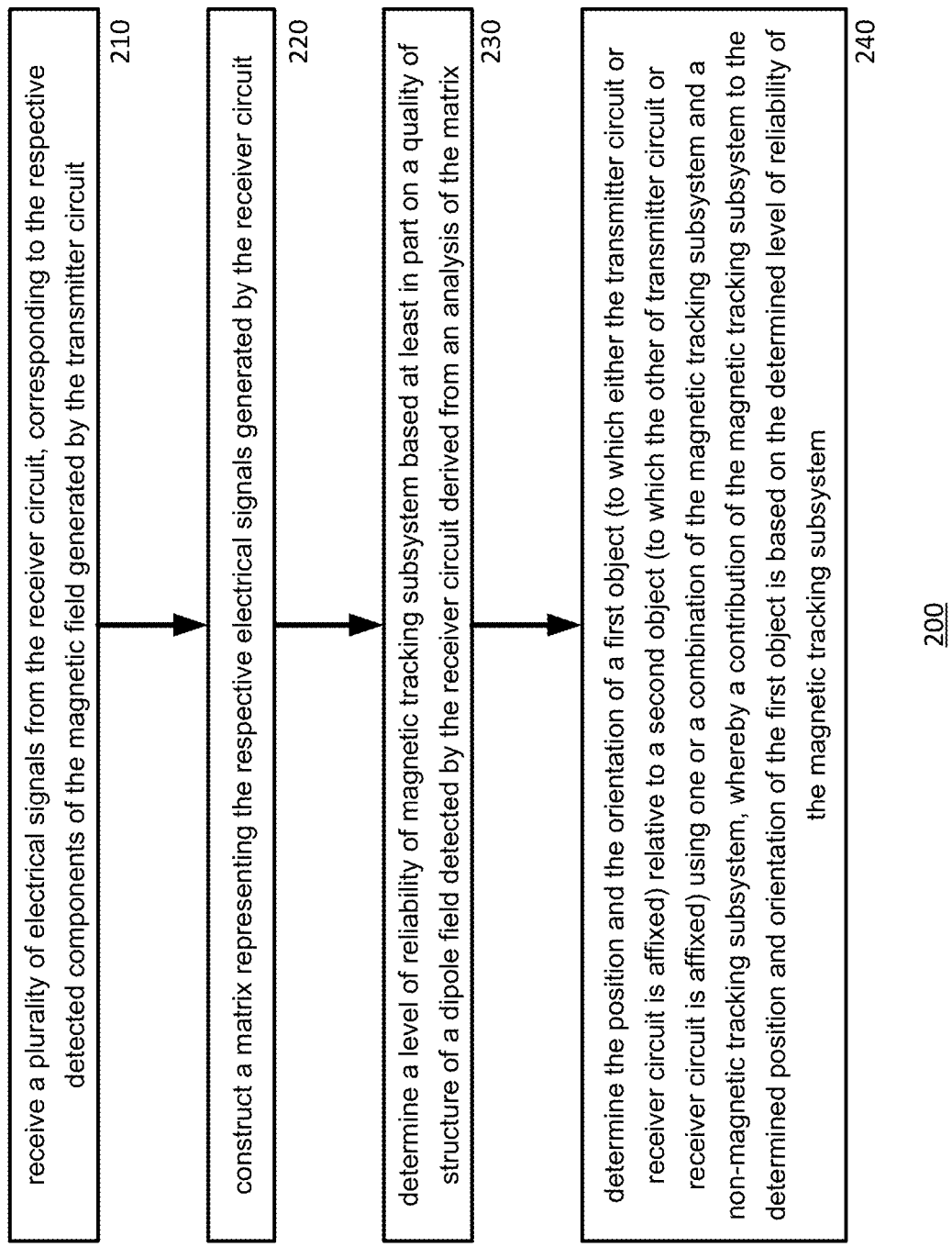
FIG. 2 is a flow diagram of an example routine in accordance with an embodiment of the present disclosure.

In some examples, the one or more computing device(s) 130 may be programmed to default to determining the PnO of the tracked object according to the magnetic PnO data 172, and to rely on non-magnetic PnO data 174 only when reliability of the magnetic PnO data 172 is low, such as below a preset threshold. A determination to rely on non-magnetic PnO data 174 may be as a supplement to the magnetic PnO data 172, or as a replacement of the magnetic PnO data 172. FIG. 2 is a flow diagram showing an example routine 200 for assessing whether to supplement or replace magnetic PnO data with non-magnetic PnO data. At least some of the operations in the routine may be carried out by the computing device(s) of the system electronics. It should be understood that in other examples, steps may be added, subtracted, replaced or reordered in the routine 200.

At block 210, a plurality of electrical signals are received from the receiver circuit. The received electrical signals correspond to the respective components of the portion of the magnetic field detected by the receiver circuit that was generated by the coil array of the transmitter circuit. Each electrical signal may have a magnitude, frequency and phase, and may correspond to a component of the magnetic field generated by a particular transmitter coil of the transmitter circuit and detected by a particular receiver coil of the receiver circuit.

At block 220, a matrix is constructed from the received electrical signals corresponding to the detected magnetic field generated by the transmitter circuit. The matrix may have an M×N structure, M, being the number of coils in the transmitter circuit, and N being the number of coils in the receiver circuit. Each component of the matrix may correspond to the electrical signal of a different transmitter coil-receiver coil pairing.

Figure 3:
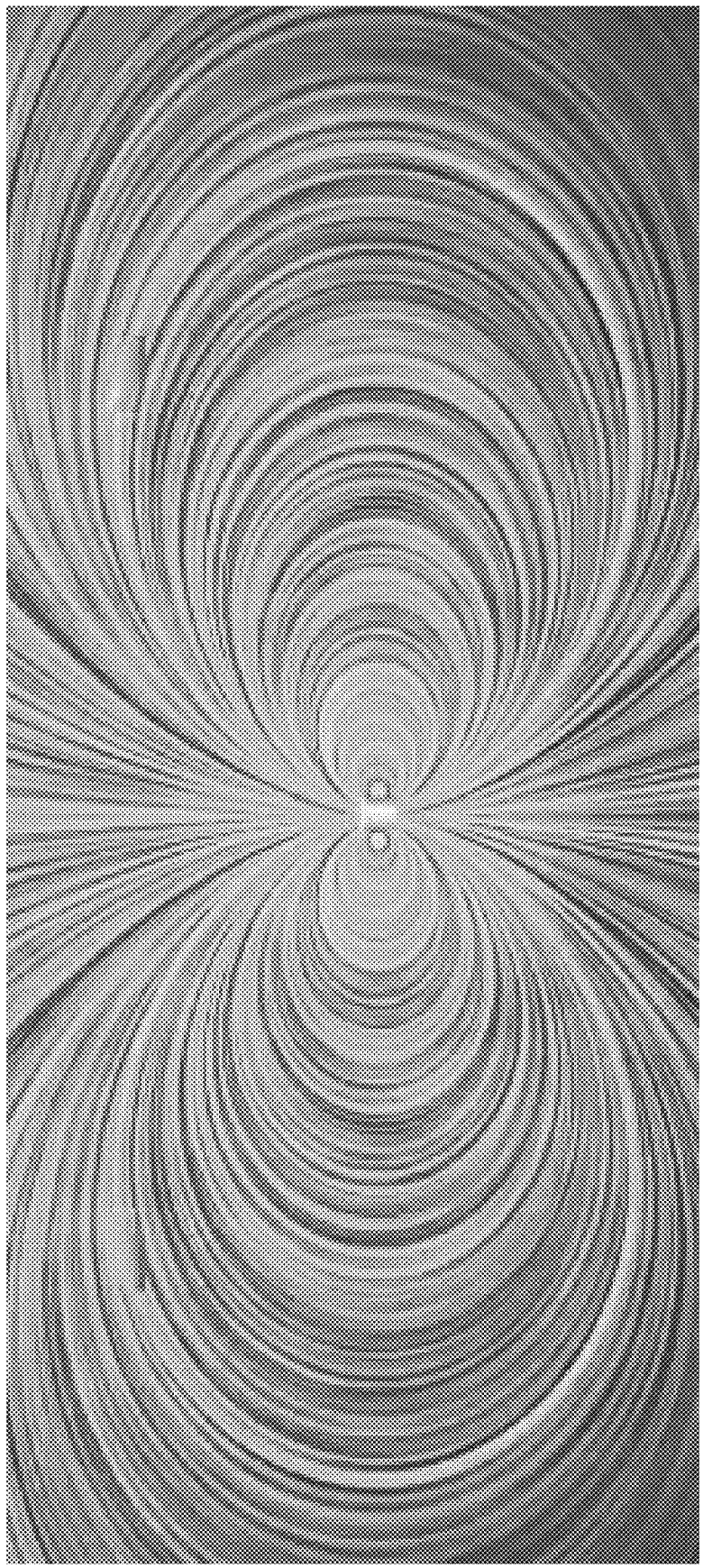
FIG. 3 is a diagram illustrating an undistorted dipole magnetic field.
Figure 4:
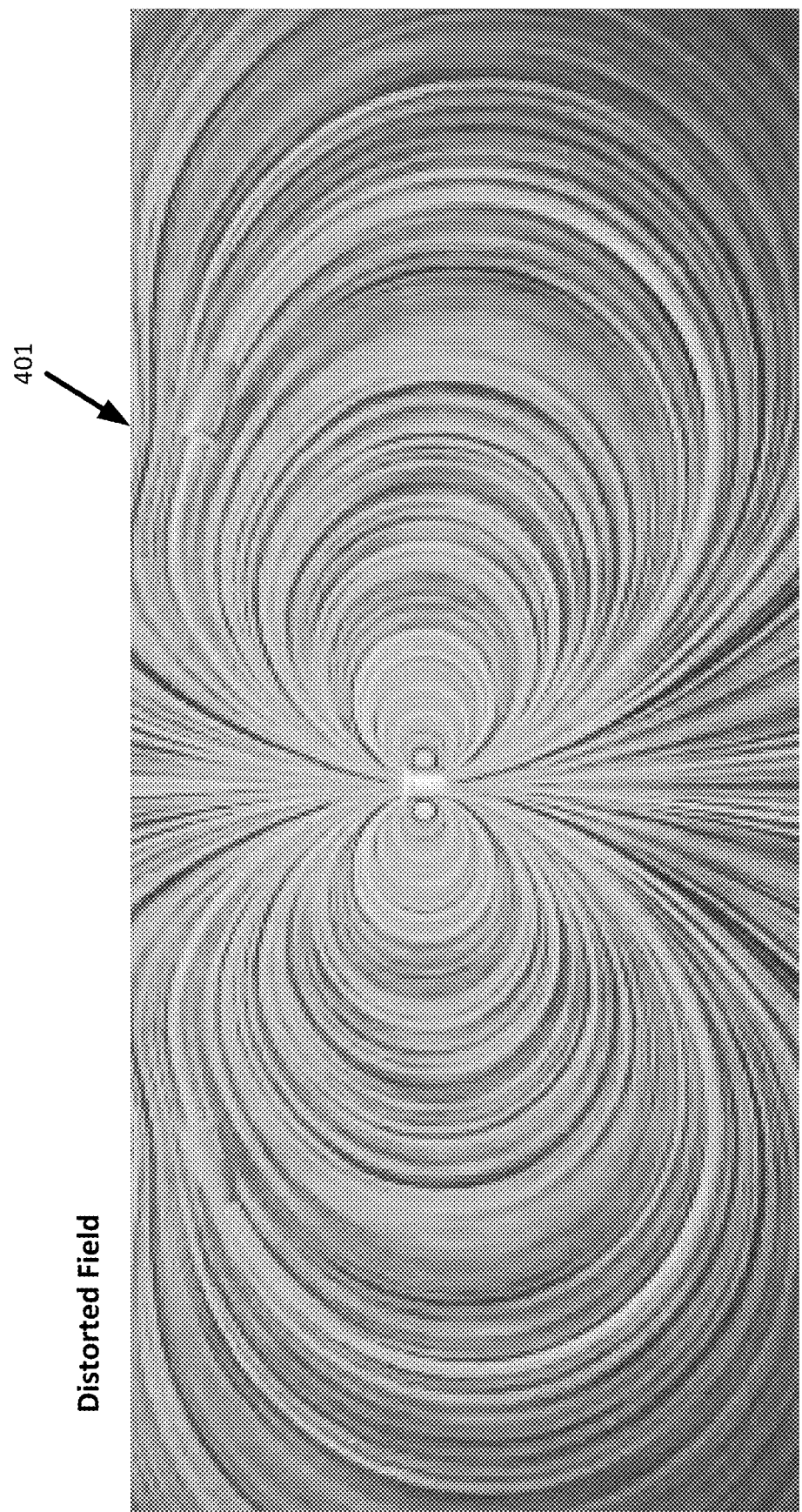
FIG. 4 is a diagram illustrating a distorted dipole magnetic field.

At block 230, a level of reliability of the magnetic tracking subsystem is determined. The level of reliability may be determined from an analysis of the matrix. The analysis may include a determination of a quality of structure of a dipole field of the detected magnetic field represented by the matrix. Typically, a magnetic field detected by the receiver circuit is expected to have a uniform dipole field structure. For purposes of illustration, FIG. 3 shows an example of a uniform, undistorted dipole field structure 300. By contrast, when distortion elements are introduced to the tracking region, the distortion elements may cause unwanted signals that distort the uniform dipole field structure. For purposes of illustration, FIG. 4 shows an example of a distorted dipole field structure 400, in which distortions 401 have the appearance of ripples in an otherwise uniform and symmetrical structure.

For a given matrix, the quality of structure of a given dipole field of the magnetic field represented by the matrix may be determined based on a mathematical analysis of the matrix. For example, the mathematical analysis may involve determining a degree of symmetry of the matrix. More specifically, the mathematical analysis may involve comparing the matrix to values representative of an ideal dipole field. Modelling the transmitter coil as an ideal dipole may be a reasonable estimation when the receiver circuit is positioned at a significant distance from the transmitter coil, such as a distance at least four times greater than the transmitter coil radius. The magnetic field magnitude and direction (also referred to as a vector) of the ideal dipole may form the shape of a symmetrical ellipsoid, such that the detected magnetic field of a properly calibrated system should have magnetic field vectors matching this shape. In this manner, determining how close the detected magnetic field represented by the matrix is to the ideal dipole may indicate a level of distortion present in the detected magnetic field, whereby a greater similarity is indicative of less distortion, and less similarity is indicative of more distortion. In turn, a level of reliability of the magnetic tracking subsystem may be at least in part correlated to the level of distortion in the tracking region of system.

Returning to FIG. 2, at block 230, determining a level of reliability of the magnetic tracking subsystem may involve factors other than a quality of structure of the detected magnetic field. For instance, strength of the detected magnetic field may decrease as the distance between the transmitter and receiver circuits increases, and since a risk of distortion in the magnetic PnO data may increase as the distance between the transmitter and receiver circuits increases, the level of reliability may further be a function of the strength of the detected magnetic field.

At block 240, the PnO of the receiver circuit, and by extension the tracked object, is determined using one or a combination of the magnetic tracking subsystem and the non-magnetic tracking subsystem. In particular, a contribution of the magnetic tracking subsystem to the determined PnO is based at least in part on the level of reliability of the magnetic tracking subsystem. In some examples, the determined PnO may further be based on a determined level of reliability of the non-magnetic tracking subsystem, which may be determined using well-known techniques (e.g., occlusion indicators, noise measurements, motion models, likelihood of drift, etc.).

Figure 5:
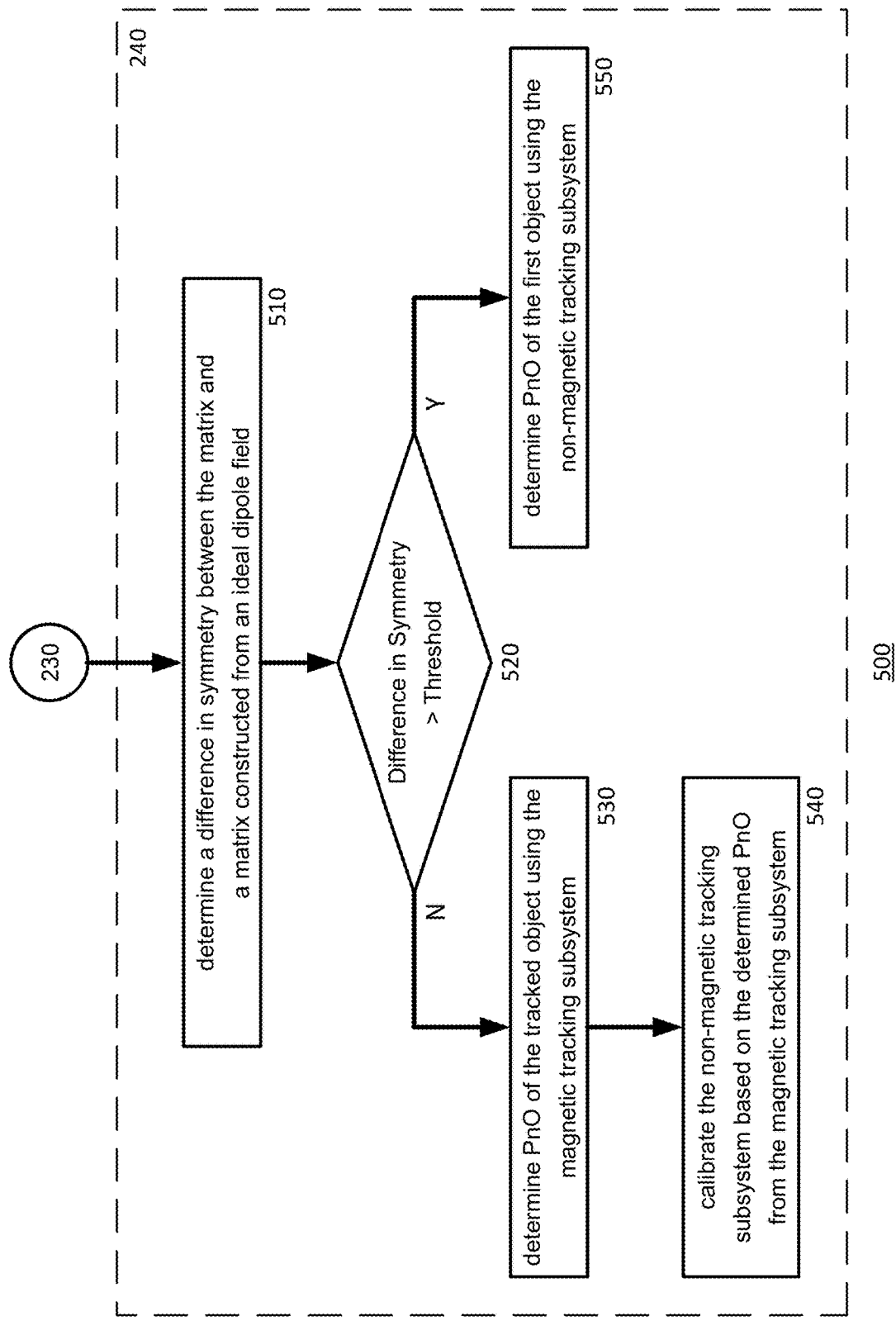
FIGS. 5 and 6 are example subroutines of the routine of FIG. 2 in accordance with respective embodiments of the present disclosure.
Figure 6:
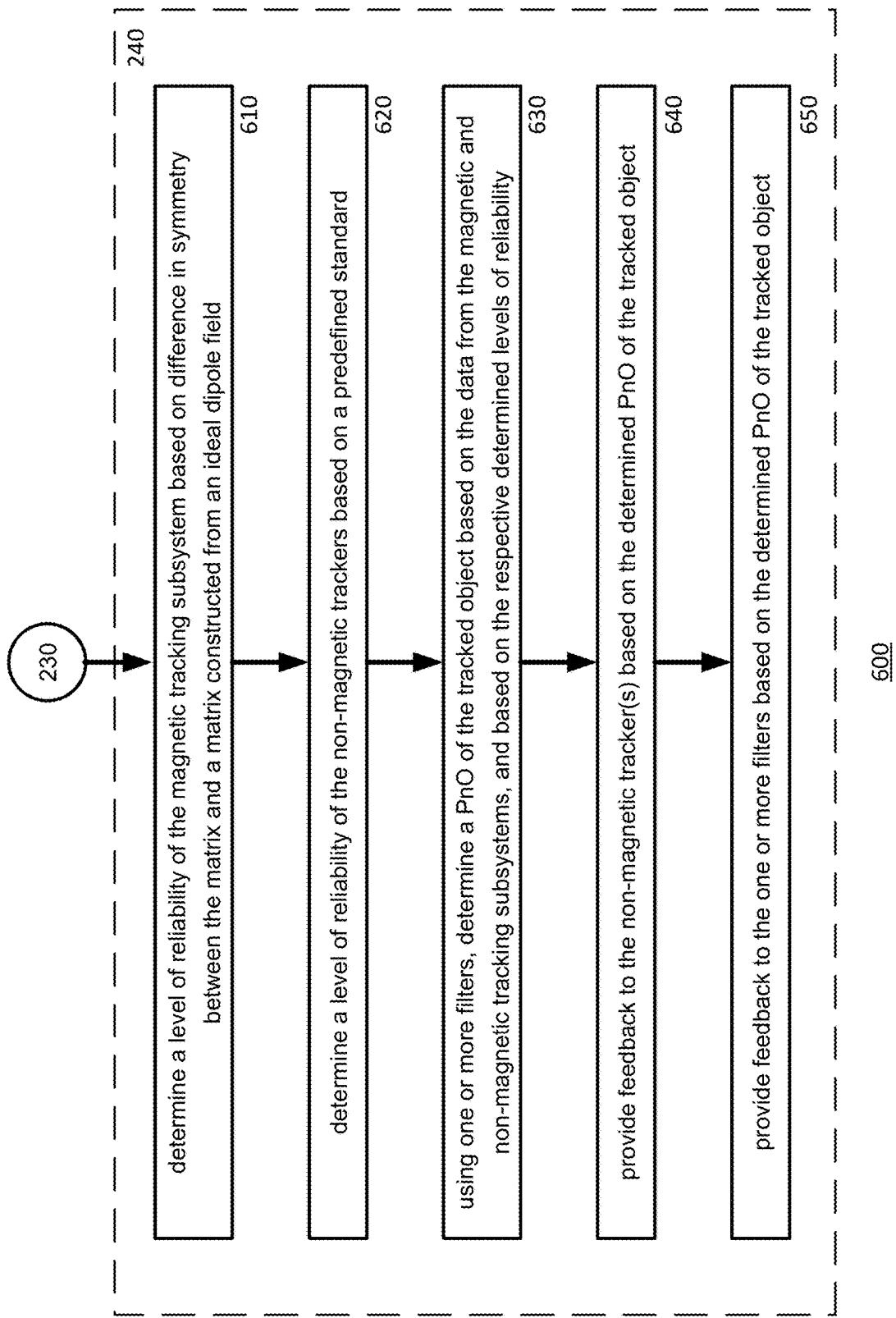

FIGS. 5 and 6 are flow diagrams showing example routines 500, 600 for switching between or mixing together magnetic PnO and non-magnetic PnO data to derive a PnO solution. At least some of the operations in the routine may be carried out by the computing device(s) of the system electronics. It should be understood that in other examples, steps may be added, subtracted, replaced or reordered in the routines 500, 600.

First with regard to FIG. 5, at block 510, a difference in symmetry between the matrix and a matrix constructed from an ideal dipole field is determined. The difference in symmetry may be calculated mathematically using known techniques, and may be indicative of a level of distortion present in the sensed magnetic field.

At block 520, the difference in symmetry is compared against a threshold value, whereby a difference in symmetry above the threshold value is indicative of unreliable magnetic PnO data, and whereby a difference in symmetry equal to or below the threshold value is indicative of reliable magnetic PnO data. Alternatively, the difference in symmetry may be further processed to include other reliability factors, such as signal strength, before being compared to the threshold value.

If the difference in symmetry is equal to or below the threshold value, then operations may continue at block 530, with the PnO of the tracked object being determined based on the magnetic PnO data from the magnetic tracking subsystem. In this example, the other non-magnetic tracking devices may be excluded from the PnO determination.

At block 540, the non-magnetic tracking subsystem may be evaluated, and in some instances corrected, based on the magnetic PnO data. For example, a PnO determination derived from the non-magnetic PnO data may be compared the PnO determination of block 530. If the determinations are the same or within a threshold amount, this may indicate that the non-magnetic tracking subsystem is properly calibrated. However, a difference between the determinations by more than the threshold amount may indicate a need for correction or calibration of the non-magnetic tracking subsystem. Particularly, in the case of an non-magnetic PnO data received from an IMU, the difference between reliable magnetic PnO data and the PnO data from the IMU may be indicative of drift in the IMU. The drift may be corrected for by adjusting a function used to process the IMU data into a PnO solution.

If the difference in symmetry is above the threshold value, then operations may continue at block 540, with the PnO of the tracked object being determined based at least partially, or entirely, on the non-magnetic PnO data from the non-magnetic tracking subsystem.

In the above examples, a single threshold value is described. However, in other examples, a plurality of threshold values may be used, whereby contributions of the magnetic and non-magnetic tracking subsystems may be scaled based on the threshold values. For further example, the system may store a curve or other function used to correlate different levels of reliability of the magnetic tracking subsystem with different degrees of contribution from the magnetic PnO data to the final PnO solution for the tracked object.

Next with regard to FIG. 6, at block 610, a level of reliability of the magnetic tracking subsystem is determined. The level of reliability may be determined based on a difference in symmetry between the matrix and a matrix constructed from an ideal dipole field. The difference in symmetry may be calculated mathematically using known techniques, and may be indicative of a level of distortion present in the sensed magnetic field based on difference in symmetry between the matrix and a matrix constructed from an ideal dipole field.

At block 620, a level of reliability of one or more non-magnetic tracking subsystems is determined. The determinations may be made for each non-magnetic tracker, collectively for all non-magnetic trackers, or in some instances for a subset of non-magnetic trackers and other trackers separately. Each non-magnetic tracker or subset of non-magnetic tracker may be evaluated based on a predefined standard. For instance, reliability of an accelerometer, gyroscope, magnetometer, optical sensor or an acoustic sensor may be based on a degree of noise present in the data obtained from the sensor. In some cases, a signal-to-noise threshold may be predefined and used to evaluate the data.

At block 630, a PnO of the tracked object is determined using the data from the magnetic and non-magnetic tracking subsystems according to the respective determined levels of reliability. The determined levels of reliability may be associated with one or more weighting factors. In some instances, a weighting factor assigned to a particular source or subsystem may be non-zero, while in other instances the assigned weighting factor may be zero. As such, the system may determine the PnO based only on the magnetic subsystem at some times, based only on the non-magnetic subsystem at other times, and based on a combination of the magnetic subsystem and the non-magnetic subsystem at other times.

In some instances, assigning a weighting factor to a given subsystem or source sensor may be based on the data from the subsystem or sensor. However, in other instances, the weighting factor of one subsystem or sensor may be influenced by another subsystem or sensor. For instance, a first subsystem or sensor may be preferred over a second one, such that a high level of reliability for the first subsystem or sensor may result in ignoring data from the second subsystem or sensor. In such an instance, the PnO of the tracked object may be determined from a single data source.

Taking for example a system that includes an electromagnetic tracker and a non-magnetic tracker that provides an orientation solution for the tracked object (hereinafter, for sake of simplicity, an IMU, although other sensors and trackers may be utilized), there may be a preference built into the routines of the system electronics to prefer deriving all or at least part of a final PnO solution from the electromagnetic tracker data over the IMU data. Thus, if the matrix constructed from the electromagnetic tracker indicates no distortion or a negligibly low level of distortion (e.g. below a first threshold amount), the IMU data may be disregarded, and optionally may further be adjusted based on the reliable electromagnetic tracker data, much like in the example routine 500 of FIG. 5.

Continuing with the above example, if the matrix constructed from the electromagnetic tracker indicates the presence of distortion (e.g., above the first threshold, optionally also below a second threshold amount), the IMU data may be utilized for a limited purpose, such as for estimating orientation of the tracked object (e.g., using a Madgwick filter) while position estimates are still derived from the electromagnetic tracker. For example, if the matrix constructed from the electromagnetic tracker is a function of both position and orientation of the receiver circuit, such as a 6DOF system accounting for three linear axes as well as azimuth, pitch and roll axes, an orientation solution from the IMU data may be used to simplify the constructed matrix, whereby the matrix is reduced to a function of only the linear axes. Assuming reliability of the IMU orientation data, the PnO equation of the electromagnetic tracker then becomes a position-only equation, and the simplified mathematics of the position-only equation produce a 3DOF position solution that is less susceptible to distortion in the magnetic field. Position can be solved with an algebraic closed form solution, an optimization function, or other known techniques.

Additionally or alternatively, if the matrix constructed from the electromagnetic tracker indicates the presence of distortion (e.g., above the first threshold amount, optionally above the second threshold amount), the IMU data may be utilized without using the electromagnetic tracker data, such as by estimating orientation of the tracked object using the IMU data and estimating position of the tracked object using dead reckoning techniques.

The above example uses the weighting factors or levels of reliability to influence how the inputs for a given PnO calculated by the system. However, in other examples, weighting factors and levels of reliability may not affect the particular PnOs calculated by the system, but instead may affect how multiple PnO determinations are mixed with one another. Stated another way, multiple PnO determinations may be calculated using a plurality of methods (e.g., electromagnetic tracker only, electromagnetic tracker for position and IMU for orientation, IMU for orientation and dead reckoning for position), and two or more of those multiple PnO determinations may be subsequently combined according to the determined weighting factors or levels of reliability.

Data from magnetic and non-magnetic subsystems and sources, one or more position and/or orientation determinations as described above, or any combination of the two, may be combined using one or more filters. The combination of this data using the one or more filters may result in a final PnO solution, which may function as the output of the system, indicating a then-current determination of the tracked object's position and orientation.

At block 640, feedback from the one or more filters may be provided to the one or more non-magnetic trackers of the non-magnetic tacking subsystem. In cases where PnO data from at least one sensor is found to have a relatively high level of reliability and PnO data from at least one other sensor belong to the non-magnetic tracking subsystem is found to have a relatively low level of reliability, providing feedback for the sensor with low reliability may help to improve future estimations. For example, this feedback may be an error feedback indicating an error in the rate of change of position or orientation inputs from the IMU, and may be used to correct drift in IMU sensor data.

At block 650, feedback from the PnO determination may be provided to the one or more filters. In this regard, the PnO solution may be used as an input to the one or more filters in order to derive an accurate result using recursive filtering. For instance, the PnO solution may provide an indication of a then-current PnO of the tracked object, which in turn may be used in processing operations of the one or more filters.

FIGS. 7-11 are block diagrams demonstrating example filter systems that may be used for combining magnetic and non-magnetic PnO data.

Figure 7:
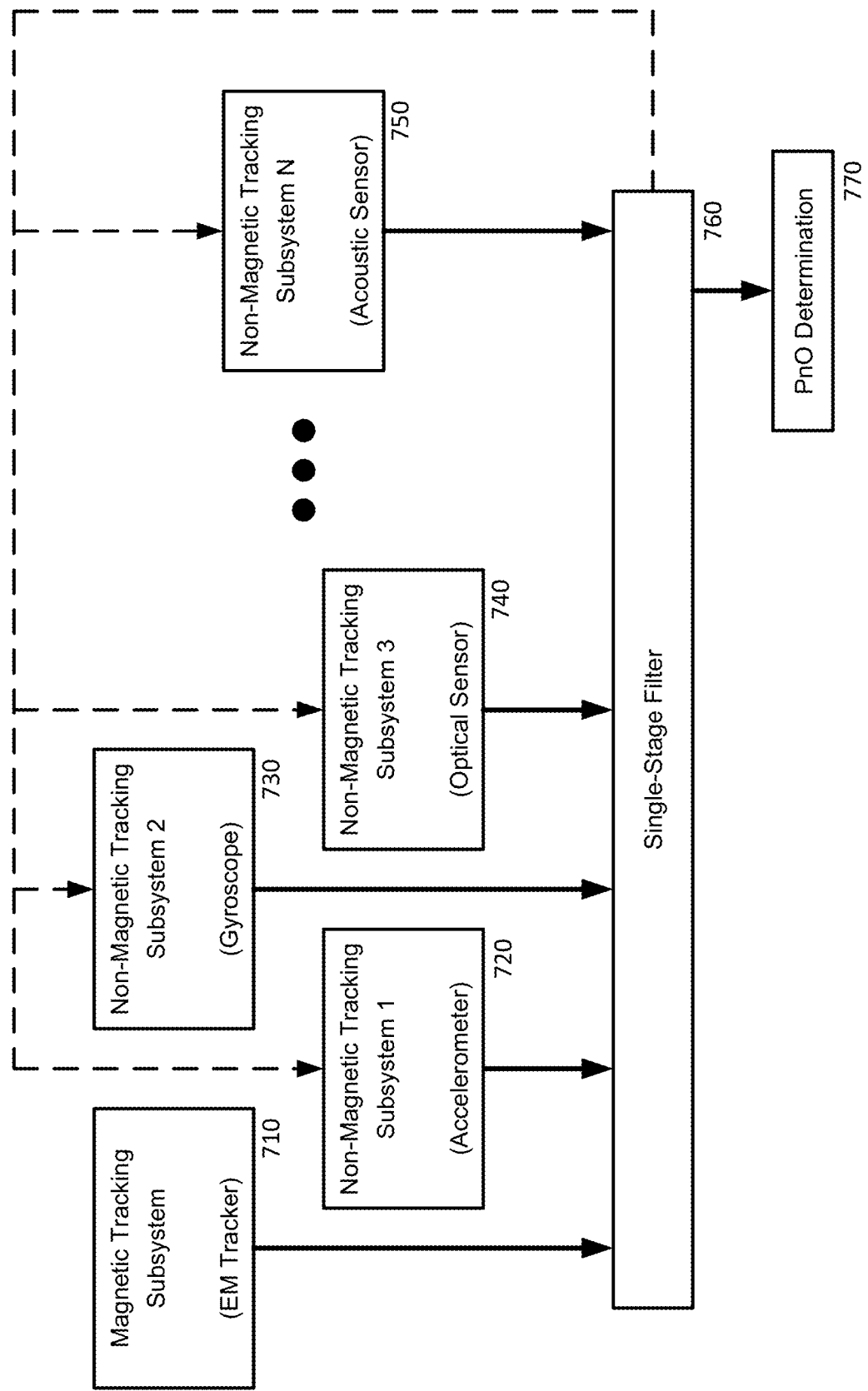
FIGS. 7-11 are block diagrams demonstrating example data combining techniques in accordance with respective embodiments of the present disclosure.

In FIG. 7, the filter system 700 is used to filter inputs from an electromagnetic tracker 710 of the magnetic tracking subsystem a plurality of N non-magnetic source sensors, which are different magnetic and non-magnetic tracking devices included in a hybrid tracking system, such as the system 100 of FIG. 1. The non-magnetic source sensors include, among others, one or more accelerometers 720, one or more gyroscopes 730, one or more optical sensors 740, and one or more acoustic sensors 750. An output from each sensor is provided to a single stage filter 760. The single stage filter 760 may be configured to combine all inputs in an estimation filter that develops and outputs a single PnO solution 770 indicating the PnO of the tracked object. For example, the single stage filter 760 may be an Extended Kalman Filter (EKF) that estimates position and orientation state variables, such as position, velocity, orientation, angular velocity, and other states, in a single stage based on predefined models, including motion models and error models (e.g., covariance models for the given source sensors of the system). The position and state variables may then be used to estimate the final PnO solution.

As discussed previously, the filter may determine which of the magnetic and non-magnetic source sensors are more or less reliable, and may assign weighting factors to the sensors accordingly. Additionally, with regard to the non-magnetic source sensors, feedback may be provided from the filter to the sensors in order to adjust or calibrate future estimations.

Figure 8:
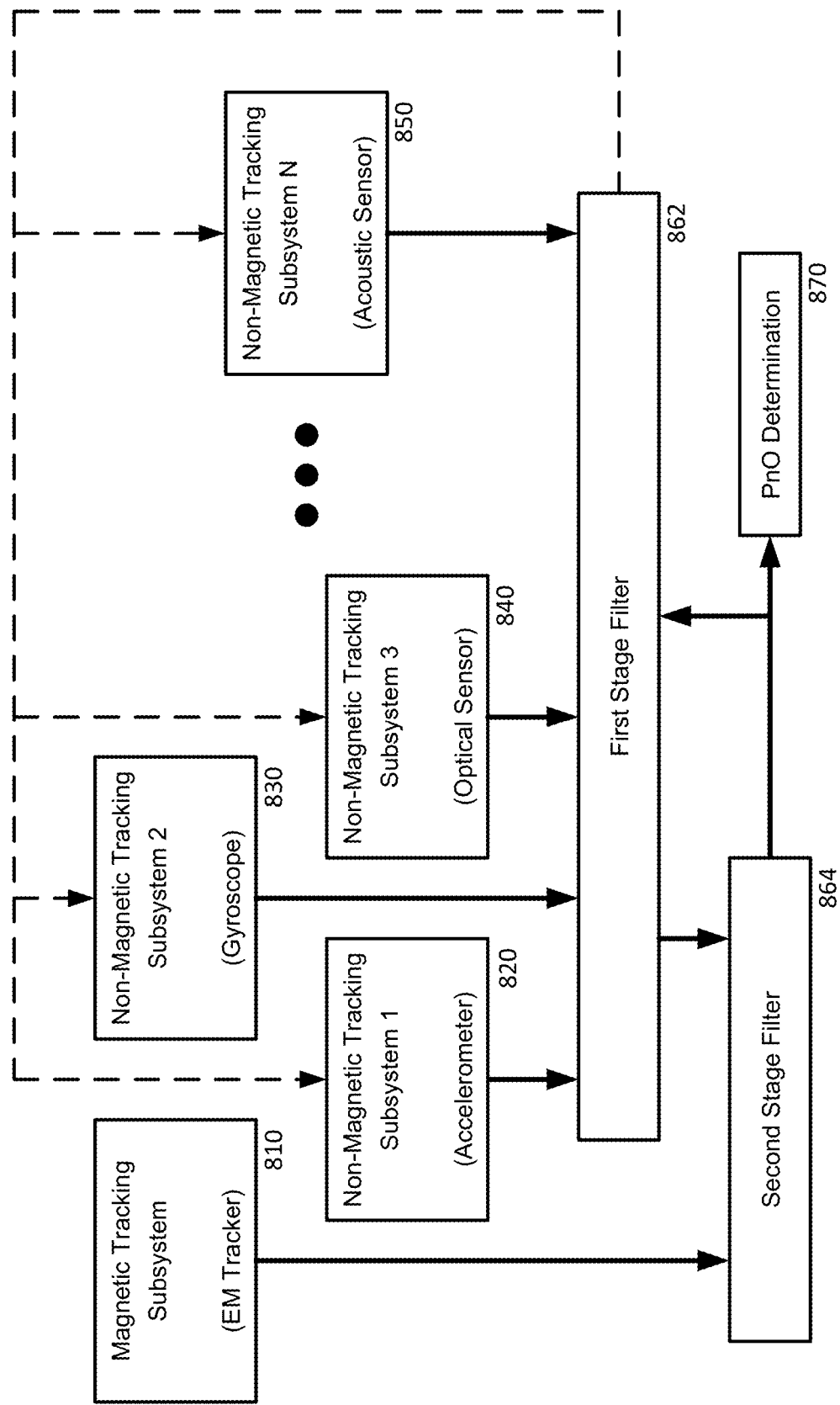

In FIG. 8, the filter system 800 includes the same inputs, that is an electromagnetic tracker 810 and N non-magnetic source sensors including, among others, one or more accelerometers 820, one or more gyroscopes 830, one or more optical sensors 840, and one or more acoustic sensors 850, but the single stage filter is replaced by a multi-stage filter. In particular, the multi-stage filter includes a first stage filter 862 receiving inputs from the N source sensors 820-850 of the non-magnetic tracking subsystem, and a second stage filter 864 receiving an output of the first stage filter 862 and an output of the electromagnetic tracker 810 as inputs. In effect, the first stage filter may perform pre-processing of the non-magnetic source sensors, including but not limiting to filtering and scaling. A PnO solution may be derived by the first stage filter 862 based on the non-magnetic PnO data, and the second stage filter 864 may then combine the non-magnetic PnO solution with the magnetic PnO data to derive a hybrid PnO solution, which may serve as the final PnO solution of the filter system 800.

As with the example of FIG. 7, the multi-stage filter of FIG. 8 may provide feedback to the non-magnetic tracking devices based on determined errors, weighting factors, levels of reliability, and the like. In the example of FIG. 8, since the first stage filter 862 receives all non-magnetic PnO data, it is used to provide the feedback. The first stage filter 862 also receives the final PnO solution 870 as an input, meaning that data based on the magnetic tracking subsystem 810 is integrated into the feedback provided to the non-magnetic tracking devices 820-850. In other examples, feedback to the non-magnetic tracking devices 820-850 may be provided more directly from a downstream filter, for example from the second stage filter 864.

Figure 9:
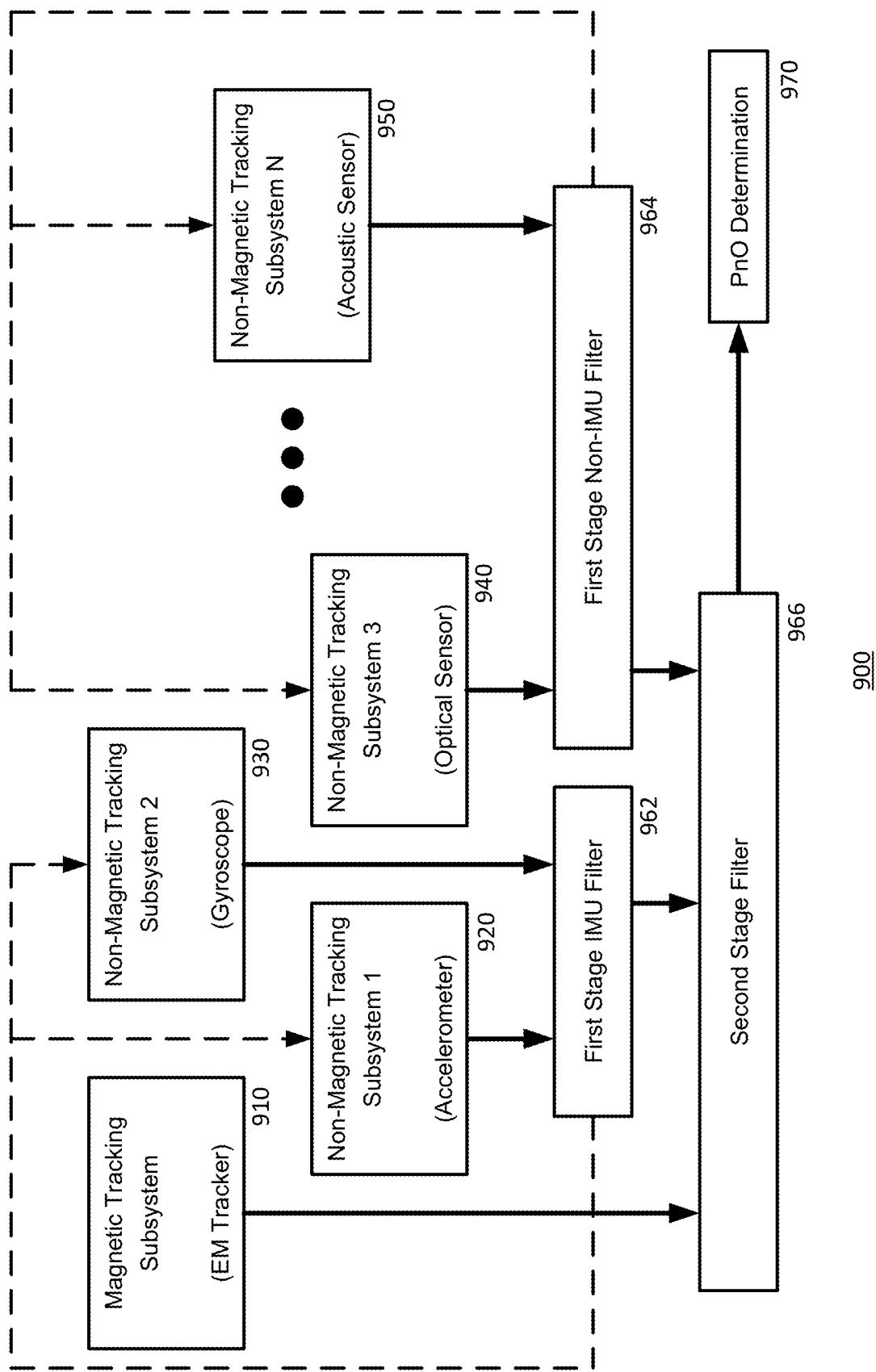

In FIG. 9, the filter system 900 includes the same inputs, that is an electromagnetic tracker 910 and N non-magnetic source sensors including, among others, one or more accelerometers 920, one or more gyroscopes 930, one or more optical sensors 940, and one or more acoustic sensors 950, but the first stage of the multi-stage filter is divided into parallel filters. A first stage IMU filter 962 receives inputs from the accelerometers 920 and gyroscopes 930 belonging to an IMU included in the hybrid tracking system. A first stage Non-IMU filter 964 receives inputs from the other non-magnetic tracking devices 930-950 of the hybrid tracking systems. Each first stage filter 962, 964 may derive a separate PnO solution, and the individual PnO solutions may be input to the second stage filter 966 with the electromagnetic tracking device PnO data in order to derive a final PnO solution 970.

As with the example of FIG. 8, the multi-stage filter of FIG. 9 may provide feedback to the non-magnetic tracking devices based on determined errors, weighting factors, levels of reliability, and the like. In the example of FIG. 9, since the IMU first stage filter 962 receives all IMU data, it is used to provide the feedback to the IMU. Likewise, the first stage Non-IMU filter 964 is used to provide feedback to the non-magnetic trackers other than the IMU.

Figure 10:
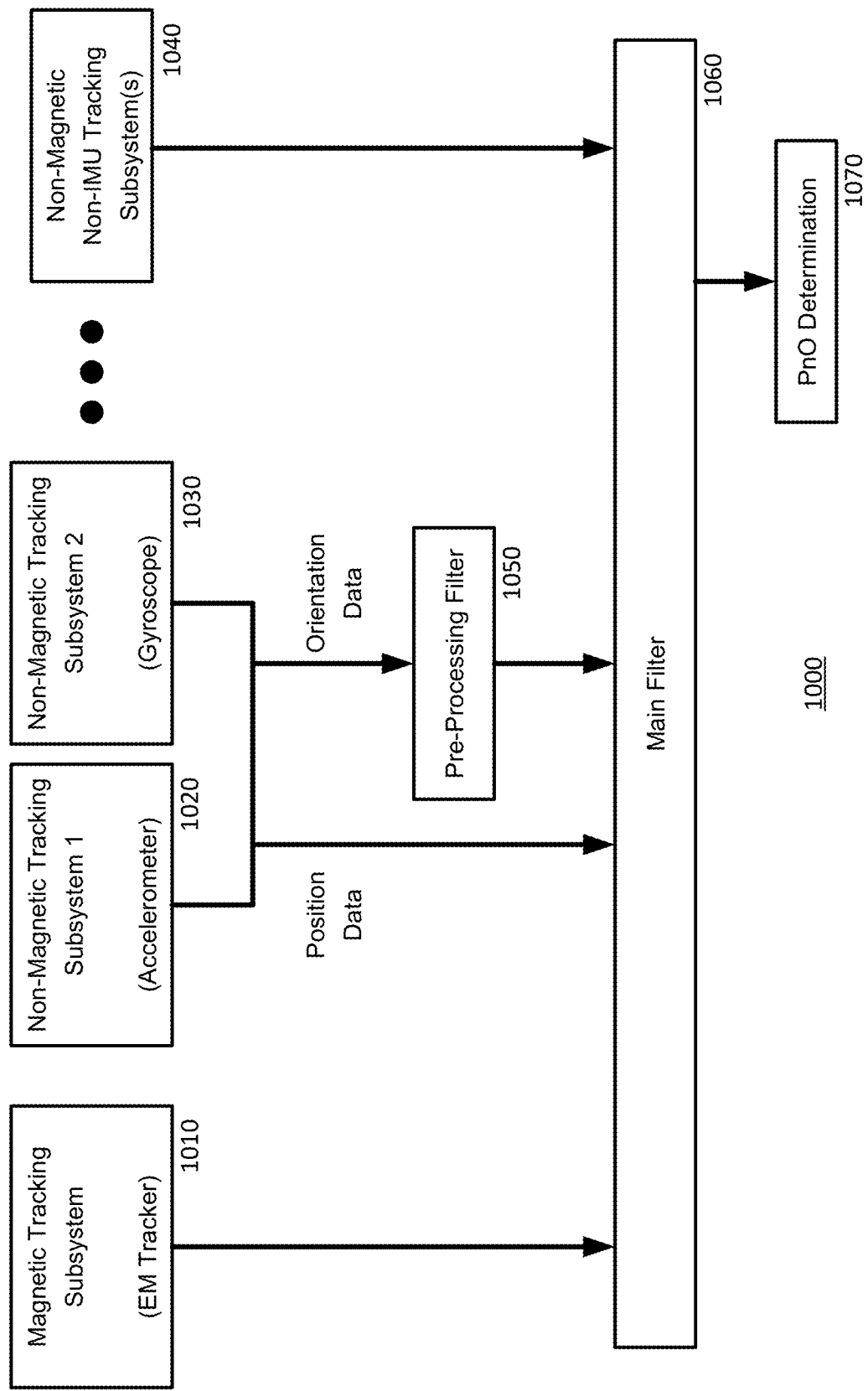

In FIG. 10, the filter system 1000 includes the same inputs, that is an electromagnetic tracker 1010 and N non-magnetic source sensors including, among others, one or more accelerometers 1020, one or more gyroscopes 1030, and one or more non-IMU sensors 1040. Like the filter system 900 of FIG. 9, the IMU data from the accelerometers 1020 and gyroscopes 1030 is pre-processed using a pre-processing filter 1050. However, unlike in FIG. 9, the position and orientation data of the IMU is separated and filtered differently. In the example of FIG. 10, the orientation data is pre-processed, while the position data may not be pre-processed before being input to a main filter 1060 to develop a final PnO solution 1070. The pre-processing of the orientation data may be performed using a filter designed for IMU orientation data, such as a Madgwick filter, to develop an improved orientation measurement before proceeding with further filtering operations. The main filter 1060 may be a single stage or multi-stage filter, such as any of the example filters shown in FIGS. 7-9.

Figure 11:
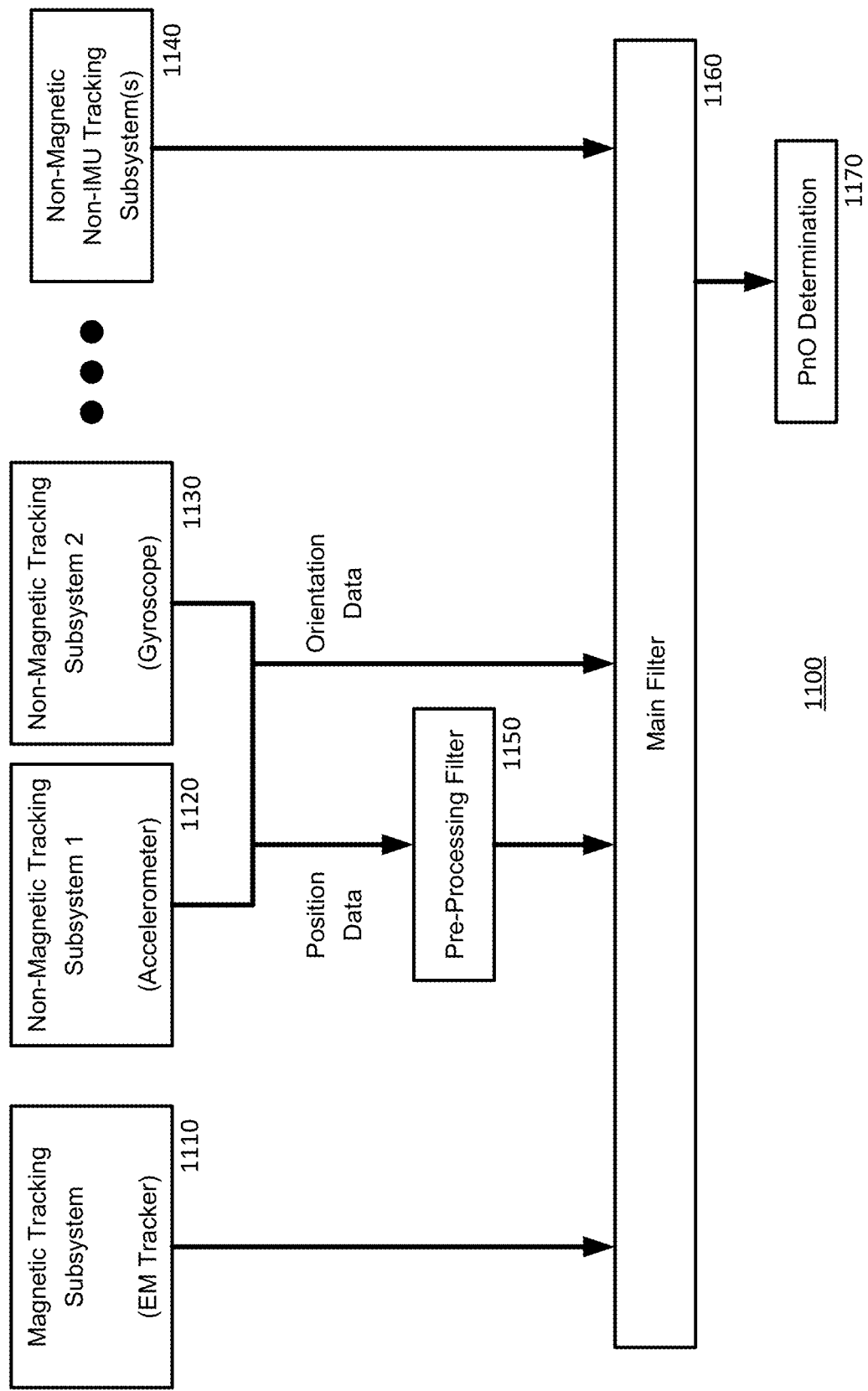

In FIG. 11, the filter system 1100 includes the same inputs, that is an electromagnetic tracker 1110 and N non-magnetic source sensors including, among others, one or more accelerometers 1120, one or more gyroscopes 1130, and one or more non-IMU sensors 1140. Like the filter system 1000 of FIG. 10, the IMU data from the accelerometers 1120 and gyroscopes 1130 is split between orientation and position data. However, unlike in FIG. 10, the position data of FIG. 11 is pre-processed, while the orientation data may not be pre-processed before being input to a main filter 1160 to develop a final PnO solution 1170. The pre-processing of the position data may be performed using a filter designed for IMU position data to develop an improved position measurement before proceeding with further filtering operations. The main filter 1160 may be a single stage or multi-stage filter, such as any of the example filters shown in FIGS. 7-9.

The filter systems 1000 and 1100 may further be combined with one another, whereby each of the IMU position and orientation data is independently pre-processed.

For the sake of illustrative clarity, some feedback paths are not shown in the examples of FIGS. 9 and 11. However, it should be understood that the feedback solutions comparable to those shown in FIGS. 7 and 8 may be provided for the example systems of FIGS. 9-11.

The example filtering techniques and solutions of FIGS. 7-11 are not exhaustive. The concepts shown in these examples may be further organized to yield different solutions. For example, position and orientation data from all sensors may be split and provided for separate filtering before being combined. For instance, separate Extended Kalman Filters or other estimation filters may be used for the independent orientation and position filtering stages. For further example, position and orientation data may be processed separately over multiple stages. For example, IMU orientation data may be input to a Madgwick filter before being mixed with orientation data from the electromagnetic tracker to develop an orientation solution, and IMU position data may be input to a first stage filter before being mixed with position data from the electromagnetic tracker to develop a position solution. The orientation and position solutions may then be combined to yield a final PnO solution. Similar multi-stage filtering concepts can be applied for other non-magnetic tracking devices to be mixed with one another, with electromagnetic tracking data, or a combination thereof. Naturally, once the orientation and position solutions are derived separately, it should be recognized that one of the orientation and position data may be filtered in a single stage, while the other is filtering in multiple stages.

The above examples generally describe sensor fusion and data fusion using Kalman filtering. However, it should be recognized that other types of filters and processing techniques for sensor fusion and data fusion may be utilized to yield PnO solutions.

Some of the above examples assume that data from the non-magnetic tracking subsystem may be unreliable, and thus not preferred in comparison to data from the magnetic tracking subsystem. However, it should be recognized that in other examples, data from a non-magnetic tracking subsystem may be treated as more reliable, and thus preferable, over data from a magnetic tracking subsystem. In this regard, a system may be programmed to rely on data from the magnetic tracking subsystem only when the non-magnetic tracking subsystem is deemed unreliable. In a similar vein, the system may be programmed to rely on position data from the magnetic tracking subsystem, but to rely on orientation data from the magnetic tracking subsystem only when the non-magnetic tracking subsystem is deemed unreliable. In yet a further example, described in greater detail above in connection with block 630 in FIG. 6, the system may be programmed to analyze position data magnetic tracking subsystem based on a determined or otherwise assumed reliability of the orientation data from the non-magnetic tracking subsystem.

Reliability of the non-magnetic tracking subsystem may be determined or otherwise ensured based on one or more of a number of factors or conditions. In one scenario, reliability may be ensured in situations where the magnetic tracking subsystem indicates no or low distortion, so that orientation data from the magnetic tracking subsystem is used to calibrate or otherwise adjust orientation data in the non-magnetic tracking subsystem (e.g., drift correction adjustment in IMU data). In another scenario, reliability may be determined based on a detected or otherwise known presence of the receiver circuit within the boundaries of a region for which distortion has been mapped in advance, whereby a distortion correction algorithm for the mapped area may be applied to the orientation data of the magnetic tracking subsystem and used to calibrate or otherwise adjust orientation data in the non-magnetic tracking subsystem. In this scenario, an indication of no or low distortion may not be required. In some scenarios, such in the case of an IMU, reliability may be determined based on a detected or otherwise known presence of the receiver circuit in a mechanical fixture that ensures accurate orientation measurements from the non-magnetic tracking subsystem. Lastly, some non-magnetic tracking devices may be simply known or otherwise assumed to be reliable, such as if a premium quality device were to be used, or if the device were recently calibrated.

The above examples generally describe mixing between magnetic and non-magnetic tracking devices based at least in part on a level of reliability of the PnO data received from the magnetic tracking device. However, the same or similar concepts may be applied to a system having multiple electromagnetic trackers, with or without non-magnetic tracking devices. For example, an electromagnetic tracking system may include multiple transmitter-receiver pairings, whereby there may be multiple transmitter circuits positioned within a tracking region of the system, and the receiver circuit detected magnetic field from each of the transmitter circuits. The detected magnetic fields may be distinguishable from one another, such as by using the techniques described in the co-owned and concurrently filed application titled "Adaptive Weighting of Multiple Sources in a Magnetic or Hybrid Tracking System." Each of the detected magnetic fields may be used to construct a separate matrix. Using the techniques of the present application, a level of reliability of each matrix may be determined, and the position and orientation PnO data derived from the matrices may be assigned weighting factors and combined with one another using the filtering techniques of the present application. Furthermore, multiple magnetic PnO determination may be mixed with PnO data from one or more non-magnetic tracking devices using the concepts described above.

The above examples generally describe systems and methods in which a receiver circuit is mounted to the tracked object and moving about the tracking region, while a transmitter circuit (or a plurality of transmitter circuits) is positioned in a fixed location to track the receiver circuit. However, due to the reciprocal nature of electromagnetic tracking systems, an alternative configuration may involve providing a receiver circuit in a fixed location, and affixing the transmitter circuit to the tracked object. In such cases, it may be preferable to include certain ones of the non-magnetic tracking devices, such as the IMU, in the transmitter circuit, in order to track the motion of the tracked object.

The above examples generally describe a system for tracking the PnO of a tracked object affixed to a receiver circuit. Such tracked objects may include but are not limited to a wearable or handheld object operated by a user, such as a helmet, a handheld surgical device, or a stylus. More generally, the methods and systems of the present disclosure may be applicable to, but are not limited to tracking the PnO of head mounted displays (HMD), handheld or wearable devices for surgical navigation (including simulations of surgical procedures), and handheld or wearable devices virtual reality or augmented reality programs.

The above examples generally describe a receiver circuit that includes an array of coils in order to detect the magnetic field generated by the transmitter circuit or circuits. However, in other examples, the receiver circuit may include sensing elements other than coils. For example, the receiver circuit may include one or more Hall effect sensing elements. It should be understood that the receiver coils of any of the above examples and embodiments may be replaced with the alternative receiver elements without changing the underlying nature of the systems and methods.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A system comprising:
   a magnetic tracking subsystem configured to track each of a position and an orientation of a first object relative to a second object; and
   a non-magnetic tracking subsystem including one or more non-magnetic tracking devices; wherein the magnetic tracking subsystem includes:
   a transmitter circuit mounted to one of the first object or the second object and including a plurality of transmitter coils aligned at different transmitter axes and an actuating circuit configured to actuate the transmitter coils to generate a magnetic field at different times or at different frequencies;

a receiver circuit mounted to the other one of the first object or the second object and including a plurality of receiver elements aligned at different receiver axes, each receiver element configured to detect a magnetic field along its respective receiver axis, each receiver element configured to detect a respective portion of the magnetic field generated by the transmitter coils, wherein the detected portion of the magnetic field includes a plurality of components, wherein each component is attributable to a given one of the transmitter coils based on time or frequency, and wherein each receiver element is configured to generate a corresponding first electrical signal for each component of the magnetic field;

one or more processors configured to:
receive the respective first electrical signals generated by the plurality of receiver elements, wherein the first electrical signals are indicative of both position and orientation of the first object relative to the second object;
receive respective second electrical signals from each of the one or more non-magnetic tracking devices, wherein the second electrical signals from at least one non-magnetic tracking device are indicative of position of the first object relative to the second object, and wherein the second electrical signals from at least one non-magnetic tracking device are indicative of orientation of the first object relative to the second object;
filter, by a first stage filter, at least a portion of the second electrical signals;
combine, by a second stage filter, at least an output of the first stage filter and the first electrical signals to derive a combined result, wherein an operation of the second stage filter is based on a level of reliability of the first electrical signals from the magnetic tracking subsystem; and
determine the position and the orientation of the first object relative to the second object according to an output of the second stage filter.

2. The system of claim 1, wherein the non-magnetic tracking subsystem includes at least two of an inertial motion unit (IMU), an optical sensor, an acoustic sensor, a radio frequency (RF) sensor, a global positioning system (GPS) or a radar chip.

3. The system of claim 1, wherein the one or more processors are configured to provide feedback from at least one of the first stage filter or the second stage filter to adjust inputs from one or more trackers of the magnetic tracking subsystem or the non-magnetic tracking subsystem.

4. The system of claim 3, wherein the non-magnetic tracking subsystem includes an IMU, and wherein the feedback is an error feedback indicating an error in a rate of change of position or orientation data received from the IMU, wherein the error feedback is configured to correct a drift error in the IMU.

5. The system of claim 4, wherein the one or more processors are configured to provide the feedback from the first stage filter, and wherein the first stage filter is an extended Kalman filter (EKF).

6. The system of claim 3, wherein the feedback is the output of the second stage filter and is provided as an input to the first stage filter.

7. The system of claim 1, wherein the first stage filter includes a first stage IMU filter and a first stage non-IMU filter, wherein the first stage IMU filter receives second electrical signals from each of an accelerometer and a gyroscope, and wherein the first stage non-IMU filter receives second electrical signals from at least two non-magnetic trackers other than the accelerometer and the gyroscope.

8. The system of claim 1, wherein one or more processors configured to:
filter, by the first stage filter, orientation data of the non-magnetic tracking subsystem; and
combine, by the second stage filter, at least the output of the first stage filter, position data of the non-magnetic tracking subsystem, and the first electrical signals to derive the combined result.

9. The system of claim 1, wherein one or more processors configured to:
filter, by the first stage filter, position data of the non-magnetic tracking subsystem; and
combine, by the second stage filter, at least the output of the first stage filter, orientation data of the non-magnetic tracking subsystem, and the first electrical signals to derive the combined result.

10. The system of claim 1, wherein the first object or the second object is a wearable device.

11. The system of claim 10, wherein the wearable device is a head mounted display.

12. The system of claim 1, wherein the non-magnetic tracking subsystem is affixed to the receiver circuit of the magnetic tracking subsystem.

13. The system of claim 1, wherein the non-magnetic tracking subsystem is affixed to the transmitter circuit of the magnetic tracking subsystem.

14. The system of claim 1, wherein the one or more processors are configured to:
determine the level of reliability of the magnetic tracking subsystem;
determine a level of reliability of the non-magnetic tracking subsystem; and
determine the position and the orientation of the first object relative to the second object using a weighted combination of the magnetic tracking subsystem and the non-magnetic tracking subsystem, wherein a weighting of the determined position or orientation of the first object derived from the magnetic tracking subsystem is based at least in part on a comparison of the determined level of reliability of the magnetic tracking subsystem and the determined level of reliability of the non-magnetic tracking subsystem.

15. The system of claim 14, wherein the level of reliability of the non-magnetic tracking subsystem is based at least in part on one or more of a motion model, a noise measurement or a rate of change measurement.

16. A method for tracking each of a position and an orientation of a first object relative to a second object using a hybrid tracking system that includes:
a transmitter circuit mounted to one of the first object or the second object and including a plurality of transmitter coils aligned at different transmitter axes and an actuating circuit configured to actuate the transmitter coils to generate a magnetic field at different times or at different frequencies;
a receiver circuit mounted to the other one of the first object or the second object and including a plurality of receiver elements aligned at different receiver axes, each receiver element configured to detect a magnetic field along its respective receiver axis, each receiver element configured to detect a respective portion of the magnetic field generated by the transmitter coils, wherein the detected portion of the magnetic field includes a plurality of components, wherein each component is attributable to a given one of the transmitter coils based on time or frequency, and wherein each receiver element is configured to generate a corresponding first electrical signal for each component of the magnetic field; and one or more processors, wherein the method comprises:
  receiving, by the one or more processors, the respective first electrical signals generated by the plurality of receiver elements, wherein the first electrical signals are indicative of both position and orientation of the first object relative to the second object;
  receiving, by the one or more processors, respective second electrical signals from each of one or more non-magnetic tracking devices, wherein the second electrical signals from at least one non-magnetic tracking device are indicative of position of the first object relative to the second object, and wherein the second electrical signals from at least one non-magnetic tracking device are indicative of orientation of the first object relative to the second object;
  filtering, by a first stage filter, at least a portion of the second electrical signals;
  combining, by a second stage filter, at least an output of the first stage filter and the first electrical signals to derive a combined result, wherein an operation of the second stage filter is based on a level of reliability of the first electrical signals from the magnetic tracking subsystem; and
  determining, by the one or more processors, the position and the orientation of the first object relative to the second object according to an output of the second stage filter.

17. The method of claim 16, further comprising providing, by the one or more processors, feedback from at least one of the first stage filter or the second stage filter to adjust inputs from one or more trackers of the magnetic tracking subsystem or the non-magnetic tracking subsystem.

18. The method of claim 16, wherein filtering by the first stage filter comprises filtering orientation data of the non-magnetic tracking subsystem, and wherein combining by the second stage filter comprises combining at least the output of the first stage filter, position data of the non-magnetic tracking subsystem, and the first electrical signals to derive the combined result.

19. The method of claim 16, wherein filtering by the first stage filter comprises filtering position data of the non-magnetic tracking subsystem, and wherein combining by the second stage filter comprises combining at least the output of the first stage filter, orientation data of the non-magnetic tracking subsystem, and the first electrical signals to derive the combined result.

20. The method of claim 16, further comprising:
  determining, by the one or more processors, the level of reliability of the magnetic tracking subsystem;
  determining, by the one or more processors, a level of reliability of the non-magnetic tracking subsystem; and
  determining, by the one or more processors, the position and the orientation of the first object relative to the second object using a weighted combination of the magnetic tracking subsystem and the non-magnetic tracking subsystem, wherein a weighting of the determined position or orientation of the first object derived from the magnetic tracking subsystem is based at least in part on a comparison of the determined level of reliability of the magnetic tracking subsystem and the determined level of reliability of the non-magnetic tracking subsystem.

21. The method of claim 20, wherein the level of reliability of the non-magnetic tracking subsystem is based at least in part on one or more of a motion model, a noise measurement or a rate of change measurement.

* * * * *